B. HEMPSTEAD.
LIFE-PRESERVER.

No. 171,018.            Patented Dec. 14, 1875.

WITNESSES:

INVENTOR:
Beall Hempstead
BY
ATTORNEYS.

UNITED STATES PATENT OFFICE

BEALL HEMPSTEAD, OF LITTLE ROCK, ARKANSAS.

IMPROVEMENT IN LIFE-PRESERVERS.

Specification forming part of Letters Patent No. 171,018, dated December 14, 1875; application filed May 28, 1875.

*To all whom it may concern:*

Figure 1:
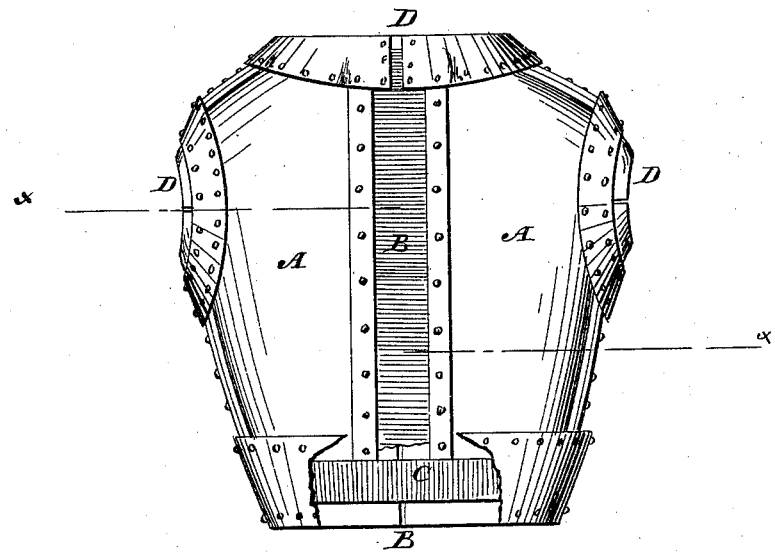
Figure 2:
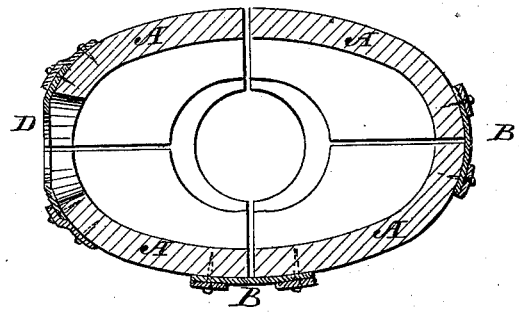

Be it known that I, BEALL HEMPSTEAD, of Little Rock, county of Pulaski and State of Arkansas, have invented a new and useful Improvement in Life-Preservers, of which the following is a specification:

Figure 1 is a front view of my improved life-preserver, part being broken away to show the construction. Fig. 2 is a detail section of the same, taken through the line $x\ x$, Fig. 1.

Similar letters of reference indicate corresponding parts.

My invention has for its object to furnish an improved life-preserver, simple in construction, very buoyant and durable, which will furnish a firm basis for the attachment of cork, springs, &c., shall be self-adjusting, and thus sure to be in proper position, shall be adapted to be worn by wearers of different sizes, and shall not be liable to accidental detachment.

The invention consists in a life-preserver, made of wood, in sections, connected and hinged to each other by rubber strips, and provided with a rubber band around the waist, and with rubber strips around the neck, waist, and arm-holes, as hereinafter fully described.

A represents the body of the preserver, which is made of wood, and in sections concaved upon their inner sides, and convexed upon their outer sides, to correspond with the general form of the upper part of a human body. The joints between the sections are covered with rubber strips B, which not only cover and connect, but also hinge, said sections to each other. The joint between the back sections is not covered, but is left free for convenience in putting on and taking off the preserver. The sections are kept closed by a rubber band or belt, C, passed around the lower part or waist of the preserver. The rubber band C may be kept from being drawn out of place or away from the preserver A by being covered with leather or other suitable material. The edges of the rubber strips B may also be covered and protected in the same way. To the sections A around the neck, waist, and arm-holes are secured rubber plates or strips D, having holes formed through their centers of such a size that the said rubber strips D may fit snugly upon the neck, body, and arms of the wearer. The edges of the rubber strip D are covered and protected by strips of leather or other suitable material. The wooden sections A furnish a firm basis for the attachment of cork, of rubber, or other springs, or other desired attachments.

If desired, the rubber pieces D may be extended so as to wholly cover the preserver, thus avoiding the use of detached pieces, and guarding against the possibility of the absorption of water by the preserver.

Having thus described my invention, I claim as new and desire to secure by Letters Patent—

A life-preserver, made of wood, in sections, A, connected and hinged to each other by rubber strips B, and provided with a rubber, band, C, around the waist, and with rubber D around the neck, waist, and arm-holes, substantially as herein shown and described.

BEALL HEMPSTEAD.

Witnesses:
FAY HEMPSTEAD,
T. J. CHURCHILL.